Patented Oct. 31, 1933

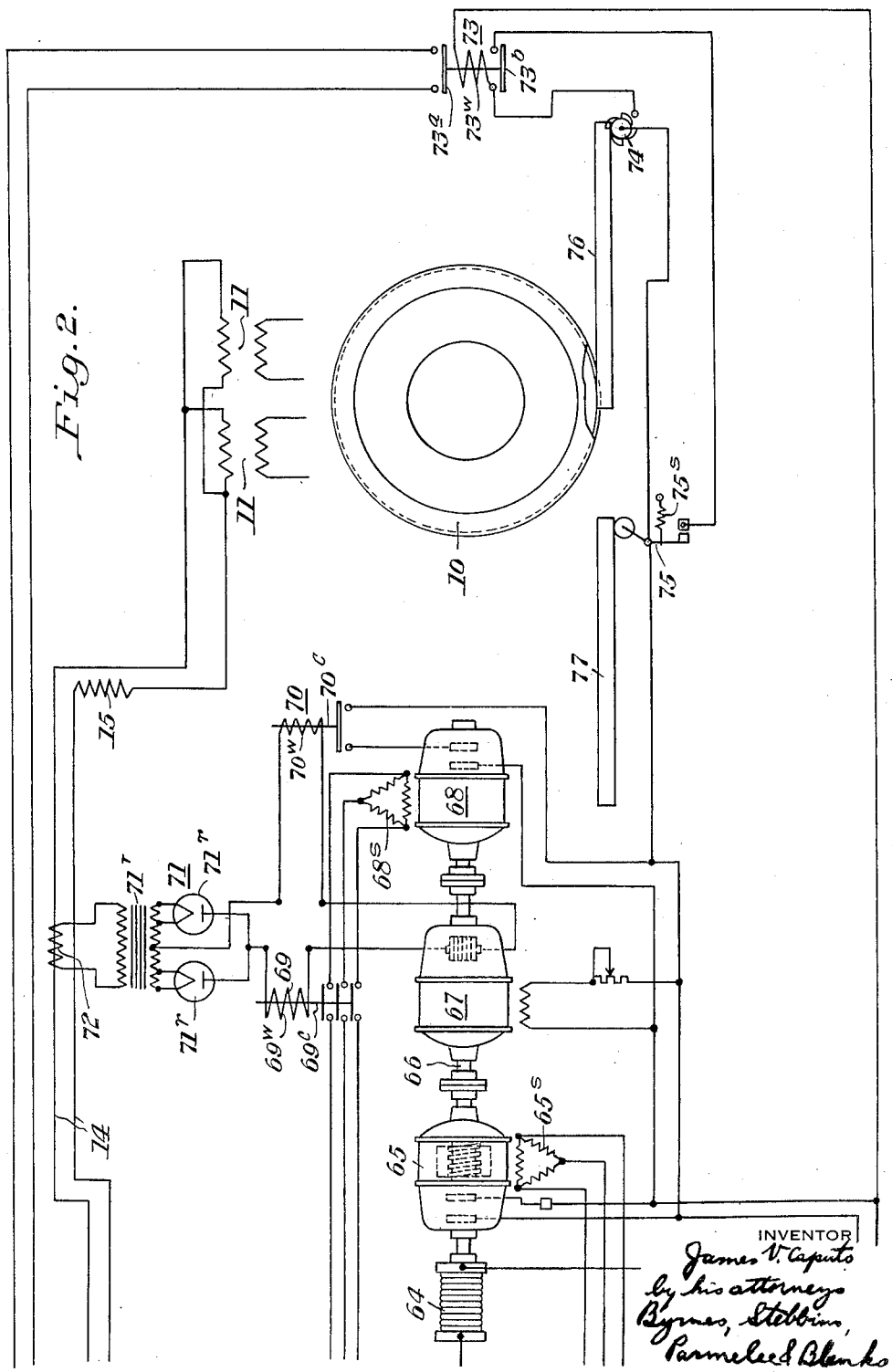

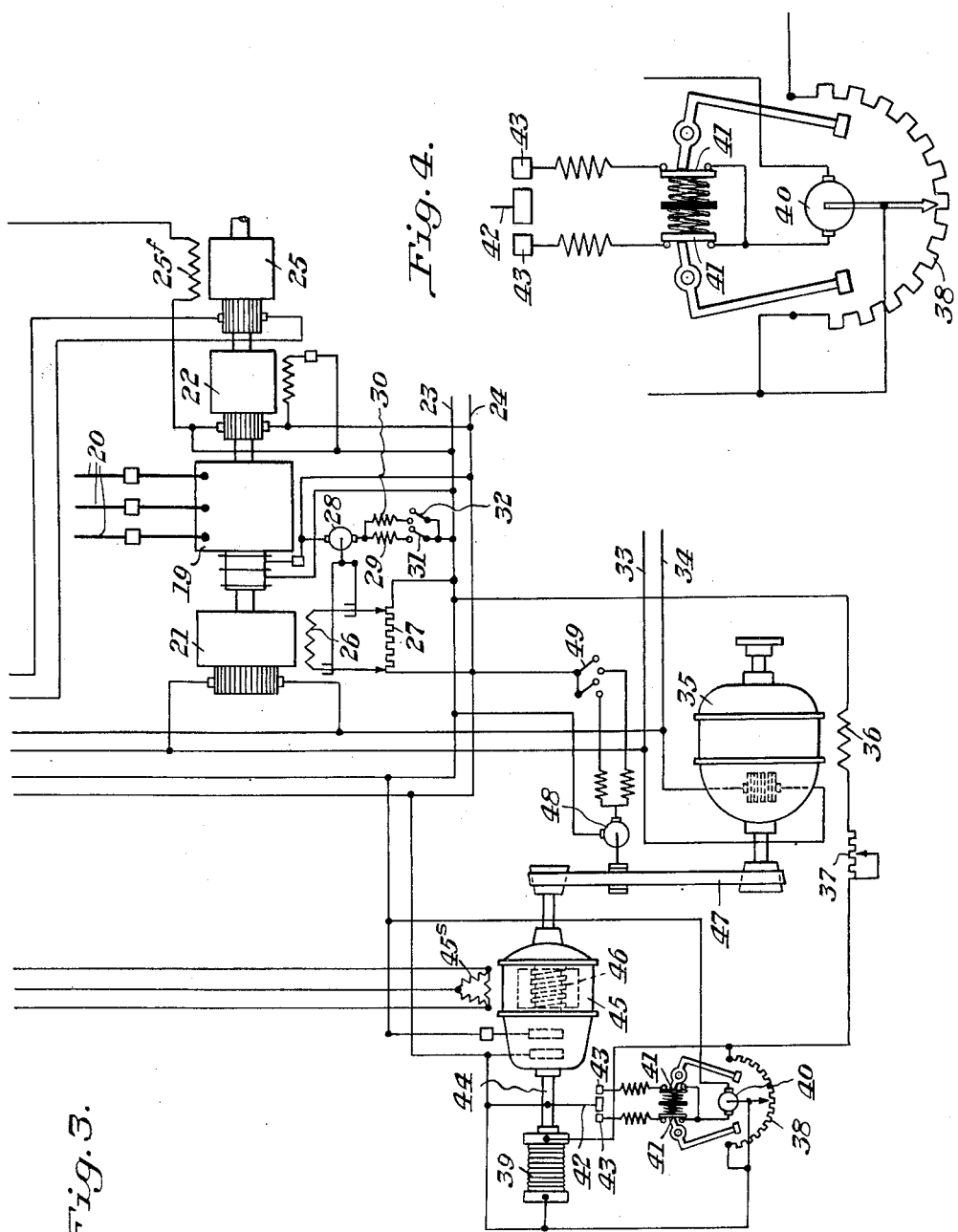

1,933,045

UNITED STATES PATENT OFFICE 1,933,045

FREQUENCY CONTROL SYSTEM FOR ELECTRIC WELDERS

James V. Caputo, Girard, Ohio

Application December 23, 1931
Serial No. 582,811

29 Claims. (Cl. 219—4)

My invention relates to a system for controlling an electric welder and the various auxiliaries utilized in connection with the operation thereof.

The present method of continuously welding a pipe includes the steps of continuously forming a length of flat skelp into a tube with an open seam cleft, passing the formed tube through a welding throat wherein the edges of the seamed cleft are heated by the passage of welding current supplied thereto by a rotating electrode, and the sizing and straightening of the welded tube. The forming mechanism, the welder proper and the sizing and straightening units include a large number of rolls for forming and feeding the tube. One method of driving these rolls which has been proposed is to use a single driving motor and to drive the rolls therefrom by shafts and gearing. While this system has the merit of simplicity of control, it is objectionable on the ground that it does not provide flexibility, since it is necessary that the speed of all units be changed simultaneously to the same extent. As an alternative to the aforementioned method, it is possible to use separate motors for driving each set of rolls. This method provides the desired degree of flexibility, but lacks any coordinated means for simultaneously changing the adjustment of all the units. It is an object of my invention, therefore, to provide a control system for the auxiliaries of an electric welder which will be highly flexible and yet subject to a coordinated adjustment.

It is known that in the practice of continuous electric welding the frequency of the welding current and the speed of travel of the formed tube should be properly correlated so as to obtain the desired continuity of the weld. If the speed is excessive for the frequency employed, successive current impulses will be spaced too far apart along the seam and a continuous weld will not be obtained. On the other hand, if the speed is too low for a given frequency, the desired rate of output will not be attained. The welding current is a further variable which requires adjustment and control in order to obtain the desired character of weld. Other objects of my invention, therefore, are to correlate properly the frequency of the welding current and the speed of travel of the tube, as well as the magnitude of the welding current.

In accordance with my invention, I employ a pair of welding generators connected in series to supply current to a welder electrode. Preferably, welding transformers are mounted for rotation with the electrode, and the generators are connected to the primary windings of the transformers. The secondary windings of the transformers are connected directly to the electrode. The generators are driven by a variable speed motor so that different frequencies can be obtained. Means are provided for controlling the resultant of the voltages of the two generators to give the proper voltage across the welding electrode.

I use a plurality of separate motors for driving each of the auxiliaries, such as the forming machine, the feed rolls of the welder, the welding electrode, and the sizing and straightening rolls. Each motor is provided with an independent speed control system and the control system of each motor is actuated in accordance with the operation of a master control element. The system also includes means whereby the speed of pipe travel may be increased without changing the frequency of the welding current, as well as means for permitting the frequency and speed to be adjusted simultaneously.

The invention also contemplates the automatic control of the speed of travel of the work or the frequency or both in accordance with the movement of the tube through the welder. Specifically, it is my intention to decrease the speed and the frequency as the tube leaves the welder.

For a complete understanding of the invention, reference is made to the accompanying drawings illustrating a present preferred embodiment thereof, together with certain possible modifications.

In the drawings,

Figure 2 is another partial diagram showing other portions of the system;

Figure 3 is another partial diagram illustrating the remainder of the system; and Figure 4 is a diagrammatic illustration of a circuit detail.

Figure 1:
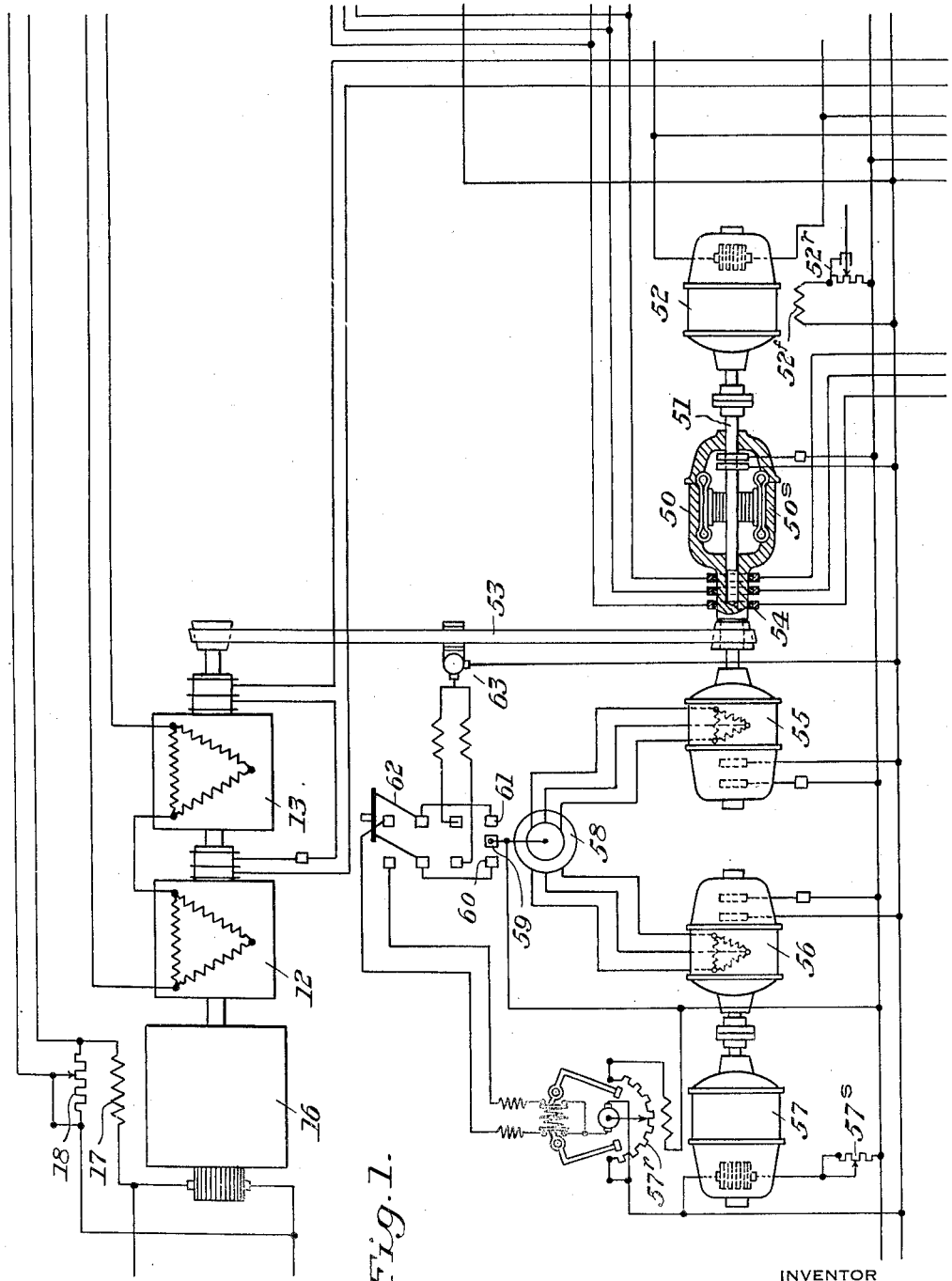
Figure 1 is a partial circuit diagram of the system.

Figure 1, 2 and 3 may be placed in juxtaposition in an obvious manner to illustrate the complete circuit diagram.

Referring now in detail to the drawings, the welder proper comprises a rotary electrode 10, transformers 11 and generators 12 and 13 connected to the primary windings of the transformers. The latter are shown diagrammatically only. Their secondaries are connected directly to the electrode and the transformers in their entirety are mounted for rotation with the electrode. Current is supplied to the primary windings through slip rings. The welding circuit, including the transformers and generators, is indicated at 14. A reactor 15 in this circuit serves to stabilize the system.

The generators 12 and 13 are single-phase generators and are driven by a variable speed motor 16 directly connected thereto. The motor 16 may be of any desired type, either alternating or direct current. Merely by way of example, I have illustrated a D. C. motor having a field winding 17 and a field rheostat 18.

The combination of two variable-voltage, single-phase generators connected in series for supplying energy to an electric welder is also described and is claimed in my copending application Serial No. 549,442, filed July 18, 1931, for Phase conversion and voltage regulating system.

A synchronous motor 19 connected to an A. C. supply circuit 20 drives a direct connected generator 21. An exciter generator 22 is also directly connected to the motor 19 and energizes an excitation and control bus 23, 24. A variable voltage exciter generator 25 is also driven by the motor 19. This generator supplies excitation for the generators 12 and 13. The control of the excitation for these generators is effected by means which will be described in detail later. The generator 21 is designed to supply direct current of variable voltage for driving the motors of the welder auxiliaries. The generator voltage is controlled by manipulating the excitation supplied to its field winding 26 which is connected to a potentiometer 27 bridging the bus 23, 24. A reversible motor 28 operates the contacts of the rheostat to vary the generator excitation. The motor 28 has forward and reverse field windings 29 and 30 controlled by manual switches 31 and 32, respectively.

The generator 21 is connected to an auxiliary bus 33, 34 from which all the motors of the auxiliaries draw their driving current. While I contemplate using separate motors for driving each stand of rolls in the forming machine, the welder feed rolls, the electrode, each stand of the straightening and sizing rolls, I have illustrated herein but one of these motors, illustrated at 35, with its associated control mechanism. The motor 35 is a D. C. motor with its armature connected across the bus 33, 34. Its field winding is shown at 36. The circuit of the field winding includes a manual rheostat 37, a motor driven rheostat 38 and a carbon-pile rheostat 39 in parallel with the rheostat 38. The rheostat 38 is shown to enlarged scale in Figure 4 and is driven by a motor 40 having forward and reverse field windings. Limit switches 41 prevent over-travel of the rheostat contact arm.

The operation of the motor 40 is controlled by a moving contact 42 adapted to engage fixed contacts 43 to energize either the forward or reverse field winding of the motor to shift the rheostat contact arm back and forth. The contact 42 and the rheostat 39 are controlled by the movement of a shaft 44 of a special synchronous machine 45. This machine has the stator winding of an ordinary synchronous motor. Its rotor winding, while similar to that of a synchronous motor, is not fixed to its shaft 44, but is rotatable on a threaded arbor 46. The shaft 44 of the unit 45 is adapted to be driven mechanically by the motor 35 through a Reeves drive 47. As long as the shaft 44 is driven through the Reeves drive 47 at a speed which is the same as that at which the rotor of the machine 45 is operated by the energization of its stator winding, there will be no axial movement of the shaft 44. Any difference in the speeds of the shaft and the rotor, however, will result in axial movement of the shaft in one direction or the other. This movement of the shaft varies the effect of the rheostat 39 and also causes the proper adjustment of the rheostat 38. A suitable thrust bearing at the end of the shaft 44 and a rotatable mounting for the contact 42 will obviously be necessary, but these mechanical details have not been illustrated. A reversible motor 48 under the control of manual switches 49 is provided to adjust the ratio of the Reeves drive. The speed of the motor 35 may thus be individually adjusted without affecting the other motors (not shown) by a method which will be explained later. The field rheostat 37 may also be used for speed control. The motor 35 is preferably connected directly to the rolls which it drives.

The stator windings of the machine 45, indicated at 45s, are energized by the output of a master frequency generator 50. This machine is also of somewhat special construction. Its field winding is mounted on a shaft 51. The stator of the machine, indicated at 50s, is mounted for rotation on the shaft 51 which is supported in suitable bearings (not shown). The adjustable speed driving motor 52 is directly connected to the shaft 51. The stator 50s is driven by the motor 16 through the shaft on which the generators 12 and 13 are mounted and a Reeves drive 53. The motor 52 has its armature connected across the terminals of the generator 21. Its field winding 52f is controlled by a rheostat 52r. The rheostat 52r is actuated by the motor 28 in common with the contacts of the rheostat 27. The arrangement is such that after the contacts of the rheostat 27 have caused a predetermined variation in field excitation, the contact of the rheostat 52r will be operated. This sequence can readily be effected by providing separate rotary contact arms for the two rheostats and mounting them all on a common shaft driven by the motor 28. When the contact arms of the rheostat 27 have traversed the contact buttons to produce the maximum change in excitation of the field winding 26, these contacts continue to move but engage a continuous strip instead of additional buttons. At that point, the arm of the rheostat 52r engages its contact buttons having previously engaged a continuous strip.

The function of the motor 52 is to drive the shaft 51 at a speed determined by the output of the generator 21. The stator 50s of the generator 50, of course, is driven at a speed proportional to the speed of the generators 12 and 13. The shaft 51 and the stator 50s are driven in opposite directions so that the frequency of the output which is taken off through the slip rings 54, is proportional to the speed of the stator relative to the shaft.

An alternating current machine 55 is also connected directly to the stator 50s. A duplicate machine 56 is connected to an adjustable speed direct current motor 57. A starting rheostat for the motor 57 is shown at 57s. The speed of the motor 57 is controlled by a rheostat 57r which is exactly similar to that shown in Figure 4. The machines 55 and 56 may be induction machines instead of synchronous machines as shown.

An electric differential relay 58 is connected between the machines 55 and 56. The relay 58 is nothing more than a small induction motor with wound rotor, designed to operate at standstill. The rotor of the relay carries a moving contact 59 adapted to engage fixed contacts 60 and 61. A double-pole, double-throw switch 62 permits the relay 58 to control the motor of the rheostat 57r or alternatively a similar motor 63 which operates to adjust the ratio of the Reeves drive 53.

The frequency generated by the master generator 50, in addition to controlling the speed of the motors driving the various auxiliaries, also affects the welding voltage. The variable voltage exciter 25 has a field winding 25f connected in series with a carbon-pile rheostat 64. The output of the exciter is supplied directly to the field windings of the generators 12 and 13 which are connected in series through slip rings. The operation of the rheostat 64 is under the control of an alternating current machine 65 identical with that shown at 45. The stator windings of this machine, indicated at 65s, are connected to the slip rings 54 exactly as are the windings 45s. The machine 65 has its shaft 66 coupled directly to the shaft of an adjustable speed direct current motor 67. The shaft of the motor 67 is coupled in turn to that of a synchronous motor 68. The stator windings 68s of the motor 68 are connected to the slip rings 54 of the generator 50 through the contacts 69c of a relay 69 having an operating winding 69w. The field windings of the machines 65, 67 and 68 are connected across the exciter bus 23, 24, as are the fields of all the other machines which have been mentioned. In each such case the field rheostat is indicated by a small rectangle. These circuits have not been described explicitly in view of their obviousness. The field circuit of the motor 68, however, includes a contact 70c of a relay 70 having an operating winding 70w. The contacts of both the relays 69 and 70 are normally closed.

The armature of the motor 67 is energized by the output of a full wave rectifier 71 including a transformer 71t and thermionic rectifying devices 71r. The rectifier transformer 71t is energized by a current transformer 72 in the welding circuit 14. A relay 73 having an operating winding 73w and contacts 73a and 73b is controlled by a rotary switch 74 and a flag switch 75. The rotary switch 74 is closed momentarily when engaged by a tube length in the position indicated at 76. The switch 75 is normally closed by a spring 75s except when engaged by a tube in the position shown at 77. The contacts 73a of the relay 73 shunts the field rheostat 18 of the motor 16 and tends to decelerate the latter. The contact 73b completes a locking circuit for the relay including the switch 75.

Substantially the above described means for maintaining operation of the motor 67 during the intervals between the passages of successive pipe blanks through the welder is also described and is claimed in my copending application Serial No. 580,885, filed December 14, 1931, for Current control system for electric welder.

Having described the apparatus and circuits comprising the system of my invention, I shall turn now to a description of the operation.

In describing the operation of the system, I shall assume first that all the units are operating at normal speed. I have not illustrated or described any starting equipment for the various units, since the details thereof are well known. The motors such as that shown at 35, may be started by slowly increasing the excitation of the generator 25. The other motors may be started according to known methods. The motor 16 may be adjusted until it drives the generators 12 and 13 at a speed such as to generate the desired frequency in the welding circuit 14, say, 60 cycles. In addition to driving the generators 12 and 13, the motor 16 drives the stator 50s of the generator 50 and the rotor of machine 55. When the motor 19 is operating at synchronous speeds, the generator 21 and the exciters 22 and 25 generate normal voltage. The generator 21, therefore, drives the motor 52 as well as the motors 35 at their normal speed. The proper normal speed for each unit can be determined by test and each unit individually adjusted until it operates at that speed under normal conditions. With the motor 52 driving the shaft 51 at a certain speed, and the stator 50s being driven at a certain speed in the other direction, the frequency generated in the stator will depend upon the difference in the speeds of the shaft and stator. The generator 50 drives the rotor of the machine 45 at a certain speed and the mechanical drive for the shaft 44 through the Reeves drive 47 is adjusted to operate at the same speed. There is thus no axial movement of the shaft 44 and no engagement of the contacts 42 and 43. Similarly, the machine 65 maintains the rheostat 64 in position to provide normal welding voltage. As long as no current flows in the circuit 14, the motor 67 will not be energized. The relays 69 and 70, however, will be deenergized and the motor 68 thereby connected so as to drive the shaft 66 at a speed corresponding to that at which the rotor of the machine 65 is driven. The machine 55 is driven at normal speed by the drive 53 and the machine 56 is driven at the same speed by the motor 57. The machines 55 and 56 being driven in synchronism, the relay 58 is in neutral position. With the apparatus in operation as described, the first piece of skelp may be fed to the former. In the forming machine, the skelp is bent to cylindrical form and advanced to the welder feed rolls. From the latter, it passes to the electrode 10 between side pressure rolls (not shown). As the tube arrives at the position 77, it opens the flag switch 75, but since the relay 73 has not been energized by the previous passage of a tube through the welder, the opening of the switch 75 has no effect. When the leading end of the tube engages the electrode 10, welding current traverses the edges of the seam. The initiation of current in the circuit 14 sets up a flow of current through the relays 69 and 70 and the motors 67. The opening of the relay contacts deenergizes the motor 68 and the shaft 66 is, therefore, driven by the motor 67 which operates at a speed proportional to the current flow in the circuit 14. If the welding current tends to decrease for any reason, the motor 67 slows down and the shaft 66 is shifted to increase the excitation for the generators 12 and 13 so that the welding current will be increased. Such an increase in welding current increases the speed of the motor 67 so that the shaft 66 operates to reduce the generated voltage. This cycle continues and a substantially constant welding current is thereby maintained.

If the speeds of all the units have been properly adjusted initially, the tube should emerge from the welder with its seam continuously welded. The operation of the switch 74 by the tube energizes the relay winding 73w so that the contacts 73a and 73b thereof are closed. The former shunts the field rheostat 18 of the motor 16 to slow down the generators. The latter closes the locking circuit for the relay including the switch 75. The purpose of decelerating the motor 16 is to permit the welding current to be terminated just the instant before the trailing end of the tube leaves the electrode. The deceleration of the motor 16, as will be described shortly, slows down the entire system. This makes it possible to terminate the flow of welding current either by deenergizing the fields of the generators 12 and 13 or by changing the vector relation of the voltages generated thereby. Regardless of what method is employed for controlling the flow of welding current, a certain minimum time is required for cutting off the current. By slowing down the whole system at the time of cutting off the current, it is possible to weld the seam in the formed tube up to within a very short distance, say, within an inch or so of its end. The scrap loss represented by the imperfect end which is sawed off is thus reduced to a minimum. When the second tube advances toward the electrode, the opening of the flag switch 75 deenergizes the relay winding 73w so that the shunt around the rheostat 18 is removed and the entire system resumes its normal speed.

As explained in the introduction to the specification, the frequency of the welding current may be varied without changing the speed of the motors driving the welder electrode and the auxiliary rolls, or the speed of the motors and frequency of the generators may be simultaneously varied. If it is found that the tube which has been welded is characterized by satisfactory continuity of the seam weld, obviously, no change in the relation between the tube speed and frequency is necessary although, of course, for economy, the welding current should have the lowest frequency for a given speed of tube travel which produces a continuous weld. If the relation of tube speed to welding frequency is satisfactory, the speed and frequency may be varied together, so that the relation therebetween is unchanged. In order to vary the pipe speed and welding frequency simultaneously, the switch 62 is closed on its upper contacts. With the switch 62 closed, the speed of the motor 16 is varied, for example, by means of the field rheostat 18. Any variation in the speed of the motor 16 is immediately reflected in the frequency generated by the generator 50. Obviously, an increase in the speed of the stator 50s increases the frequency generated. The speed of the machine 55 is simultaneously varied. If it is increased, it tends to supply energy to the machine 56 to drive it as a motor. A flow of energy from the machine 55 to machine 56 causes the contact 59 of the relay 58 to engage its contact 60 to complete a circuit for the motor of the rheostat 57r, so that the rheostat is operated to increase the speed of the motor 57. The resulting acceleration of the machine 56 restores the relay 58 to normal and prevents further adjustment of the speed of the motor 57. An increase in the frequency of the generator 50 causes the rotor of the machine 45 to accelerate. The contact 42 then engages the contact 43 and the rheostat 29 is operated to increase the resistance in the circuit of the field winding 36. The rheostat 38 is correspondingly operated by the engagement of contact 42 with its right-hand contact 43. The speed of the motor 35 is thereby increased. The increase in the speed of the motor 35 is reflected back to the control mechanism by the Reeves drive 47 which speeds up the shaft 44 to restore the contact 42 to neutral.

The increased frequency of the generator 50 likewise affects the machine 65 and increases the excitation of the generators 12 and 13 to supply increased welding current to the electrode 10. An increase in the welding current, of course is necessary because of the increased section of metal to be welded per unit of time. The increase in the welding current likewise reflects back through the motor 67 to terminate the adjustment of the welding current at the proper time.

It will be apparent from the foregoing that the entire system including the former, welder and straightener, is accelerated by speeding up the motor 16. The welding current is likewise increased proportionately and the same quality of product should result at the higher rate of output. Obviously, deceleration of the motor 16 results in a general slowing down in the operation of the system by the converse of the cycle just described.

Now if the relation between the frequency and the tube speed is such that continuous welding is not effected, it becomes necessary to increase the frequency while maintaining the speed or to decrease the speed while maintaining the frequency. Either operation can be performed with the same facility. The first step is to shift the switch 62 into engagement with its lower contacts. The speed of the motor 16 can now be adjusted to give the desired frequency of welding current. If the motor 16 is accelerated, it will immediately speed up the stator 50s and the machine 55. The relay 58 operates immediately, however, and now controls the motor 63 to shift the drive 53 until the speed of the shaft 51 returns to its original value, whereupon the relay 58 reassumes its normal position. The generator 50 is immediately slowed down and now operates at its original speed, as the final result, even though the speed of the motor 16 has been increased. With the same speed of pipe travel, the frequency of welding current is increased. The successive welds caused by each alternation are thus spaced more closely together. The momentary acceleration of the stator 50s, of course, operates the relay 58 by establishing a phase difference between machines 55 and 56 without tending to increase the speeds of the auxiliary motors. Adjusting operations may be performed while the welder is operating or idle.

If the frequency is found to be satisfactory, but it is desired to vary the speed of the tube, one of the switches 31 and 32 may be operated to increase or decrease the voltage across the buses 33, 34. The speeds of the motors similar to 35 are proportional to the voltage across this circuit. If the limit of the voltage adjustment by movement of the contacts of rheostat 27 has been reached, further adjustment may be made by operating the rheostat 52r. This has the effect of changing the speed of the shaft 51 for a given voltage across the bus 33, 34. The altered frequency generated by the generator 50 causes a corresponding alteration in the speeds of various motors by further adjusting the other rheostats 38. The rheostats 38 are intended to care for the course regulation of the motor speeds and the rheostats 39 to exercise a fine adjustment substantially continuously. Obviously, the motors similar to 35 may be decelerated by properly manipulating the contacts of the rheostat 27.

When the proper relation between welding frequency and tube speed has been obtained, the switch 62 will preferably be reclosed upon its upper contacts so that any subsequent variation in speed of the motor 16 for whatever reason will effect a corresponding variation in the speed of the tube travel so that the continuity of the weld will not be affected.

It will be apparent from the foregoing description that the system of my invention provides a means for simultaneously adjusting the speed of all the auxiliaries of an electric welder without in any way limiting the flexibility of control which is obtained by the use of separate driving motors for the various auxiliaries. The synchronizing of the auxiliaries is important for many reasons, one of which is that properly synchronized driving rolls do not score the pipe. If one set of rolls turned faster than the speed of pipe travel, marking of the product would naturally result. I am able to vary both the speed of the tube and the frequency of the welding current, either independently or simultaneously. Each of the auxiliary units may be adjusted independently so that it performs its function in synchronism with the other units. After the several units have once been adjusted, they always operate in synchronism at a speed determined by the master generator. Stable operation is assured under all conditions.

Instead of using a special machine such as that shown at 45 and 65, I may provide a frequency-comparing relay such as a synchroscope for controlling the speeds of the auxiliary motors and the welding voltage. According to such modification the relay would compare the frequency of the master generator with that of small generators driven by the various motors and correct the speed of the latter accordingly. In principle, the modification is the same as that of the system described above, i. e., synchronized speed control by means of a master frequency. This embodiment of the invention includes only electrical speed measuring devices instead of direct, mechanical, speed-comparing means.

Although I have illustrated and described herein but a single preferred embodiment of the invention, it will be obvious that many changes in the system disclosed may be made without departing from the spirit of the invention or the scope of the appended claims.

I claim:

1. The combination with an electric welder, auxiliary motors and a variable frequency generator for supplying welding current, of a control system for the auxiliary motors comprising a variable voltage generator for supplying current to said motors, means for varying the excitation of said motors in accordance with the frequency of said welding generator, and means for varying the voltage of said variable voltage generator independently of the frequency of said welding generator.

2. The combination with an electric welder, a plurality of auxiliary motors and a welding generator for supplying welding current, of a control system comprising a variable voltage generator for supplying current to said auxiliary motors, and means responsive to the frequency of the welding generator and the voltage of the variable voltage generator for controlling the excitation of said auxiliary motors to vary their speed.

3. The combination with an electric welder, a variable frequency welding generator, and auxiliary motors, of a control system for the motors including means responsive to the frequency of said generator for controlling the speeds of said motors in accordance therewith.

4. The combination with an electric welder, having a variable frequency generator and auxiliary motors, of means responsive to the generator frequency for controlling the excitation of said motors, and independent means for varying the voltage applied to said motors.

5. The combination with a welder, a variable voltage welding generator therefor, and auxiliary motors, of a system for controlling the speeds of the auxiliary motors including means actuated in accordance with the frequency of said generator for varying the excitation of said motors, and independent control means for varying the voltage applied to said motors, whereby the speeds of said motors may be varied simultaneously with or independently of the frequency of said generator.

6. The combination with an electric welder, and a variable frequency welding generator, of means responsive to the frequency of said generator and to the current supplied thereby for controlling the excitation of said generator, and means for suspending operation of said first-mentioned means on cessation of the welding current.

7. The combination with an electric welder having a variable frequency welding generator, an electrode for supplying current to the seam being welded, and transformers between said generator and electrode, of means controlled by movement of the pipe past the electrode for reducing the frequency of said generator and the speed travel of the work when the end of the seam being welded approaches the electrode.

8. In an electric welder having a variable frequency welding generator, a control system for a plurality of auxiliary motors comprising means for providing a control characteristic determined by the frequency of said welding generator, and means responsive to said means for controlling the speeds of the auxiliary motors.

9. In an electric welder having a variable frequency welding generator, a plurality of auxiliaries, a control system comprising means for generating a control function proportional to the frequency of said generator, means responsive to said first-mentioned means for controlling the speed of the auxiliaries in proportion to the frequency of said generator, and means for varying the relation between the frequency of said generator and said first-mentioned means, whereby the speed of said motors may be adjusted in accordance with or independent of changes in the frequency of said generator.

10. In an electric welder having a variable frequency generator, a control system for a plurality of auxiliary motors comprising a variable voltage generator for supplying current to said motors, a generator driven in accordance with the frequency of said first-mentioned generator and the voltage of said second-mentioned generator for generating a master control frequency, and means responsive to said frequency for varying the excitation of the fields of said motors in accordance with said master frequency.

11. In a welder, a variable frequency welding generator, a control system for a plurality of auxiliary motors comprising means for varying the speed of said motors in accordance with the frequency of said generator, and means responsive to changes in the frequency of the welding generator for automatically altering the effect of changes in the frequency of the welding generator on the means for controlling the motor speeds.

12. An apparatus for alternating current welding comprising an electrode, transformers for supplying current thereto, a source of variable frequency alternating current connected to said transformers, means for advancing work to the electrode, means for varying the frequency of said source, and means for simultaneously varying the speed of the work.

13. Apparatus for alternating current welding comprising an electrode, transformers connected thereto, a source of variable frequency current connected to said transformers, variable speed means for delivering work to the electrode, and means for reducing the frequency of the welding current and the speed of the work as the end of the work approaches the electrode.

14. In a welder, a welding generator, means for varying a characteristic of the generator current, a plurality of auxiliary motors for said welder, means for controlling the speeds of said motors including means responsive to said variable characteristic of said welding generator for varying the voltage applied to said motors, and independent control means for varying the excitation of said motors whereby their speeds may be varied simultaneously with or independently of the variable characteristics of said generator current.

15. The combination with an electric welder, auxiliary motors for driving associated apparatus and means for supplying welding current to said welder, of a control system for the auxiliary motors comprising a variable voltage generator for supplying current to said motors, and means responsive to the magnitude of the welding current for varying the speed of said auxiliary motors.

16. A control system for an electric welder having a plurality of auxiliary motors and a welding generator for supplying current to said welder comprising a variable voltage generator for supplying current to said auxiliary motors, and means responsive to the voltage of the variable voltage generator for controlling the excitation of said auxiliary motors to vary their speed.

17. The combination with an electric welder, a variable frequency current supply for said welder, and auxiliary motors for driving associated apparatus, of a control system for said motors including a variable voltage generator for supplying current thereto, and means responsive to the frequency of said source for varying the speeds of said motors.

18. The combination with an electric welder, a variable frequency current source therefor, and a plurality of auxiliary motors, of a control system for said motors including a master frequency generator having a rotatable stator and rotor, means for driving one of said last mentioned elements at a speed proportional to the frequency of said source, means driven at the speed of said auxiliary motors for driving the other of said elements, and means responsive to the difference in the speeds of said elements for controlling the speeds of said motors.

19. The combination with an electric welder, a variable frequency source of current therefor, and auxiliary motors for driving associated apparatus, of speed control means for said auxiliary motors comprising a master frequency generator having a rotatable stator and rotor, means for driving one of said last mentioned elements in accordance with the frequency of said source, means for driving the other of said elements at a speed proportional to that of said motors, and means responsive to frequency of said master frequency generator, for controlling the speeds of said motors.

20. The combination with an electric welder, a variable frequency source of current therefor, and auxiliary motors for advancing work through the welder, of a control system for said motors comprising a master frequency generator having a rotatable stator and rotor, means for driving one of said elements at a speed proportional to the frequency of said source, means for driving the other at a speed proportional to that of said motors, means for independently adjusting said last mentioned means, and means responsive to the frequency of said master frequency generator for controlling the output of said source.

21. The combination with an electric welder having a variable frequency current source, and auxiliary motors for feeding work to the welder, of a control system for said motors comprising a master frequency generator having a rotatable stator, means for driving the stator at a speed proportional to the frequency of said source, a variable voltage generator for supplying current to said motors, a motor energized by the output of said variable voltage generator for driving the rotor of said master frequency generator, and means responsive to the frequency of said master frequency generator for controlling the speed of said motors.

22. The combination with an electric welder having a source of variable frequency current and motors for driving the welder auxiliaries, of a control system for said motors comprising a master frequency generator having a rotatable stator and rotor, means for driving one of said last mentioned elements at a speed proportional to the frequency of the source, and means responsive to the frequency of said master frequency generator for controlling the speed of said motors.

23. In an electric welder having a variable frequency generator and auxiliary motors, a control system for the auxiliary motors comprising a variable voltage generator for supplying current to said motors, a generator driven in accordance with the frequency of said first-mentioned generator for generating a master control frequency, and means responsive to said last mentioned frequency for varying the excitation of said motors.

24. In an electric welder having a variable frequency generator and auxiliary motors, a control system for said auxiliary motors comprising a variable voltage generator for supplying current to said motors, a generator driven in accordance with the voltage of the variable voltage generator for generating a master control frequency, and means responsive to said last mentioned frequency for varying the excitation of said motors.

25. In an electric welder having a variable frequency generator, a system for controlling the speeds of auxiliary motors comprising a master frequency generator having a rotatable stator, means for driving said stator at a speed proportional to the frequency of said generator, a variable voltage generator for supplying current to said auxiliary motors, a motor energized by the output of said variable voltage generator for driving the rotor of said master frequency generator, and means responsive to the frequency of said last-mentioned generator for controlling the speeds of said auxiliary motors.

26. In an electric welder having a variable frequency generator, a system for controlling the speeds of auxiliary motors comprising a master frequency generator having a rotatable stator, means for driving said stator at a speed proportional to the frequency of said generator, a variable voltage generator for supplying current to said auxiliary motors, a motor energized by the output of said variable voltage generator for driving the rotor of said master frequency generator, means responsive to the frequency of said last-mentioned generator for controlling the speeds of said auxiliary motors, and means for varying the relation between the frequencies of said welding generator and the master frequency generator.

27. In an electric welder having a variable frequency generator, a system for controlling the speeds of auxiliary motors comprising a master frequency generator having a rotatable stator, means for driving said stator at a speed proportional to the frequency of said generator, a variable voltage generator for supplying current to said auxiliary motors, a motor energized by the output of said variable voltage generator for driving the rotor of said master frequency generator, means responsive to the frequency of said last-mentioned generator for controlling the speeds of said auxiliary motors, and independent means varying the voltage of said variable voltage generator to vary the speed thereof without changing the frequency of said master frequency generator.

28. In an electric welder, a variable voltage welding generator, a master frequency generator for controlling the speeds of auxiliary motors, means for driving the master frequency generator at a speed proportional to that of the welding generator, and means responsive to the frequency of said master frequency generator and to the welding current for varying the magnitude of the latter.

29. In an electric welder, a variable frequency welding generator, a master frequency generator driven thereby for controlling the speeds of auxiliary motors, and means for automatically changing the relation between the frequencies of the welding generator and the master frequency generator, when the frequency of the welding generator is varied.

JAMES V. CAPUTO.